United States Patent [19]

Ragland, Jr.

[11] 4,286,164

[45] Aug. 25, 1981

[54] METHOD FOR DETERMINING THE AVERAGE WIDTH OF LUMINESCENT STRIPES OF A VIEWING SCREEN

[75] Inventor: Frank R. Ragland, Jr., Lancaster, Pa.

[73] Assignee: RCA Corporation, New York, N.Y.

[21] Appl. No.: 120,472

[22] Filed: Feb. 11, 1980

[51] Int. Cl.³ .......................................... G01N 21/64
[52] U.S. Cl. .............................................. 250/461 R
[58] Field of Search ............... 250/461 R, 458, 459, 250/302

[56] References Cited

U.S. PATENT DOCUMENTS

| | | | |
|---|---|---|---|
| 4,001,842 | 1/1977 | Suzuki et al. | 354/1 |
| 4,049,451 | 9/1977 | Law | 96/36.1 |
| 4,110,760 | 8/1978 | Van Nets | 354/1 |
| 4,127,773 | 11/1978 | West | 250/461 R |
| 4,158,778 | 6/1979 | Gard et al. | 250/461 R |
| 4,161,656 | 7/1979 | Marcuse et al. | 250/461 R X |

Primary Examiner—Davis L. Willis
Attorney, Agent, or Firm—E. M. Whitacre; G. H. Bruestle; L. Greenspan

[57] ABSTRACT

In the novel method, the widths of the parallel luminescent stripes of a luminescent viewing screen are scanned by a beam of ultraviolet light whereby the stripes are excited to emit light along the path of scan. The emissions of the light in an identifying spectral band are sensed with respect to the position of the light beam on the screen and converted to a train of electrical signals. Then, the average width of the stripes identified by the spectral band is calculated from the distance over which the intensities of the signals are continuously above an assigned value.

10 Claims, 3 Drawing Figures

METHOD FOR DETERMINING THE AVERAGE WIDTH OF LUMINESCENT STRIPES OF A VIEWING SCREEN

BACKGROUND OF THE INVENTION

This invention relates to a novel method for determining the average width of photoluminescent stripes in a localized area of a luminescent viewing screen. The novel method is particularly useful for measuring the luminescent stripes in a shadow-mask color-television picture tube of the type having a striped viewing screen.

A shadow-mask picture tube comprises an evacuated envelope having therein a luminescent viewing screen comprising red-emitting, green-emitting and blue-emitting screen elements; electron-beam-producing means for exciting the screen to luminescence; and a shadow mask between the screen and the electron-beam-producing means. The mask is an apertured metal sheet that is precisely shaped and spaced adjacent the screen so that the mask apertures therein are systematically related to the screen elements. In one variety of shadow-mask picture tubes, the screen elements are parallel luminescent stripes and the apertures are arranged in columns that are parallel to the length of the stripes, and the apertures are elongated in the same direction. This type of screen and methods for making it are described in the prior art; for example, in U.S. Pat. No. 4,049,451 issued Sept. 22, 1977 to H. B. Law. The stripes are both cathodoluminescent (excitable by electrons) and photoluminescent (excitable by ultraviolet light).

In most prior methods, the screen of a tube is made photographically, using its shadow mask as a photographic master, on the inside surface of the viewing window of the faceplate panel of the tube. Subsequently, the panel with the screen and mask therein is assembled with other parts into a picture tube. After the screen is made, but before the panel is assembled with other parts, it may be desirable to determine the average widths of the luminescent stripes of the screen. This determination may be used for process control or for quality-assurance purposes.

A direct measurement using a microscope and reticule is too slow and too expensive for routine mass-production procedures. Furthermore, the accuracy of such a measurement is highly dependent on the skill of the microscope operator. A desirable determination is one that is fast, low in cost, accurate and not dependent upon human skills. The novel method satisfies these requirements.

SUMMARY OF THE INVENTION

The novel method comprises the following steps broadly speaking. First, the widths of the parallel luminescent stripes of a luminescent viewing screen are scanned with a beam of ultraviolet light, whereby the stripes are excited to photoluminescence along the path of the scan. The intensities of the photoluminescence in an indentifying spectral band are sensed with respect to the position of the light spot and converted to a train of electrical signals. Then, the average width of the stripes identified by the spectral band is calculated from the distance over which the intensities of the signals are continuously above an assigned value.

The novel method is conveniently practiced with a line or striped three-color screen intended for use in a shadow-mask color-picture tube. In that case, the screen and mask are assembled in their normal spaced positions. Then, the screen is illuminated through the mask from an ultraviolet-light source, whereby spots of light pass through the mask apertures and are incident on the screen. Then, the widths of the stripes are scanned by moving the light source and the mask and screen with respect to each other. Selected emissions from stripes of each of the emission colors may be selected by an optical filter that passes an identifying spectral band to an optical sensor.

DETAILED DESCRIPTION OF THE PREFERRED EMBODIMENT

Figure 1:
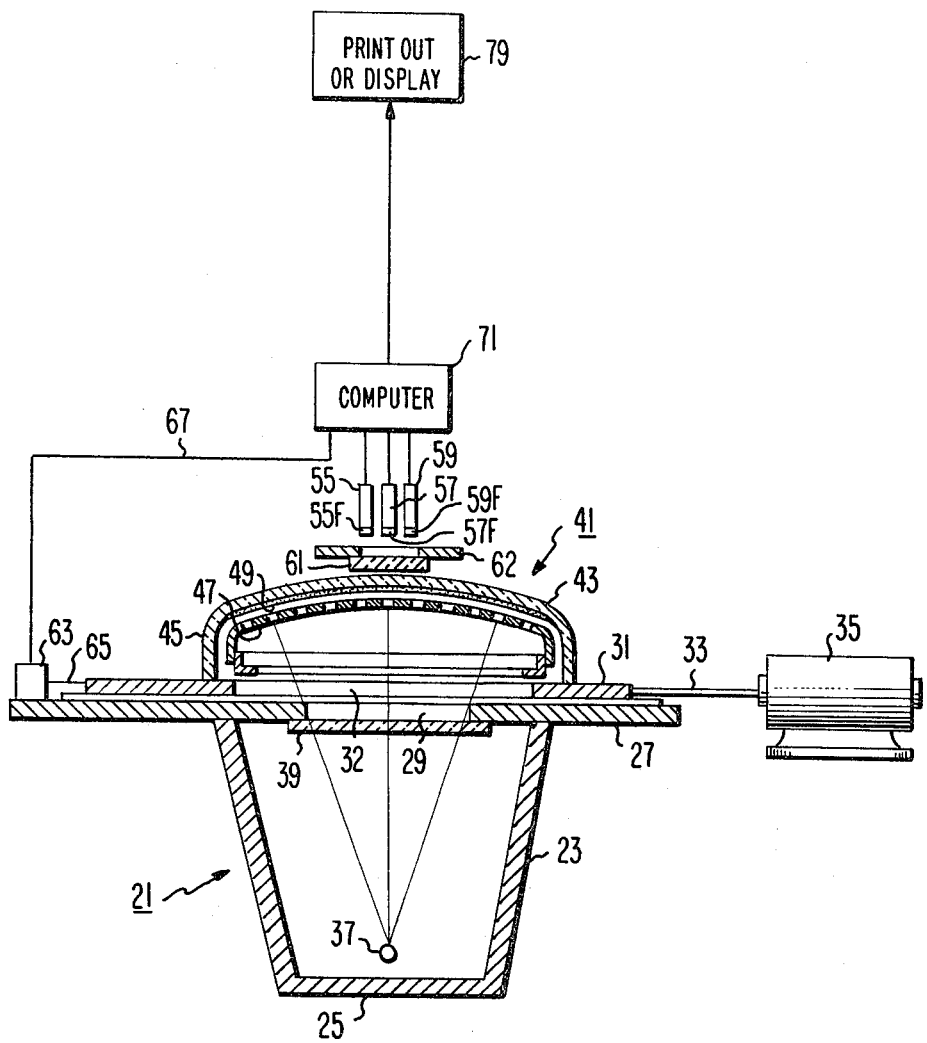
FIG. 1 is a partially-schematic, partially-sectional elevational view of an apparatus for practicing a preferred embodiment of the novel method.

FIG. 1 shows a lighthouse 21 that is adapted for practicing the novel method and a block diagram of an electronic system for processing the information to obtain the average line widths in localized areas of a viewing screen for a shadow-mask-type color-television picture tube. The tube, which is described in more detail in the Law patent mentioned above and need not be redescribed in detail here, comprises a faceplate panel, a luminescent viewing screen on the inner surface thereof and a shadow mask mounted in the panel in close spaced relation with the screen. The screen comprises a multiplicity of substantially parallel red-emitting, green-emitting and blue-emitting stripes arranged in trios in cyclic order. The mask has columns of apertures, which columns are substantially parallel to the stripes, and which apertures are elongated into slots in the long direction of the stripes and columns. The columns of apertures are systematically related to the stripes, there being one column of apertures for each trio.

The novel method is adapted for determining the average width of the stripes of each of the emission colors in a localized area of the screen before it is assembled into a tube. The stripe widths of one or more of the emission colors may be determined at the same time. Also, the average widths of stripes in one or more localized areas may be determined at one time. Also, the average spacing between the centers of adjacent color stripes and from trio to trio may be determined. The novel method will be described with respect to determining, at the same time, the average widths of the stripes of all three of the emission colors in a single localized area of the screen.

The lighthouse 21 comprises a light box 23 comprising a cup closed at one end by an integral endwall 25. Mounted on the open end of the box 23 is a plate 27 having a central aperture 29 and a track (not shown) on the outer side thereof. A panel carrier 31, which has a central opening 32, rides in the track and can be moved to the left or right. As viewed in FIG. 1, the carrier 31 is moved by a connecting rod 33 driven linearly from a suitable actuator 35. An ultraviolet-light source 37, which emits in the shape of a line (normal to the plane of FIG. 1) is positioned in the bottom of the box 23 with the long direction normal to the direction of the track on the plate 27. If desired, a small area, or point light source may be used. A UV pass filter 39, which passes ultraviolet light but does not pass visible light, is positioned over the aperture 29 in the plate 27.

Figure 2:
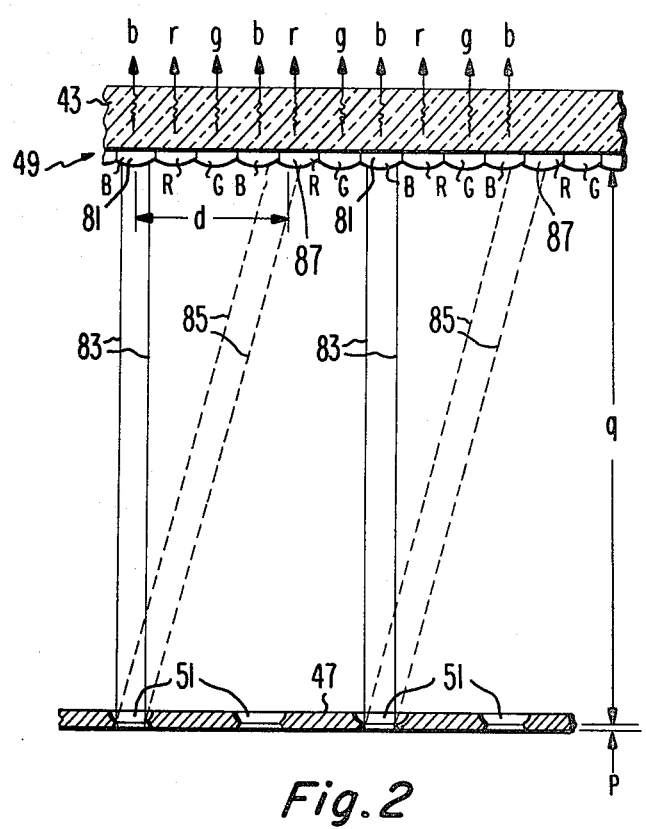
FIG. 2 is a sectional view of fragments of the mask, screen and windows during the practice of the novel method on the apparatus shown in FIG. 1.

A panel 41 having a central viewing window 43 and an integral sidewall 45 is shown positioned with the extended end of the sidewall 45 against the carrier 31 and the viewing window 43 facing upwardly. A shadow mask 47 is mounted in the panel, and a luminescent screen 49 is attached to the inner surface of the window 43 a short distance from the mask 47. The structure of the mask 47 and the panel 41 is shown in more detail in FIG. 2. The mask is spaced a short distance "q" from the screen 49 and a long distance "p" from the light source 37. The distance "p" is such that the position of the light source 37 is in substantially the same position relative to the screen 49 and mask 47 as was the light source used to print the screen 49. The screen 49 comprises a multiplicity of photoluminescent stripes cyclically arranged in trios, each trio comprising a red-emitting stripe R, a green-emitting stripe G and a blue-emitting stripe B. The panel 41 is so positioned that the stripes R, G and B are perpendicular to the direction of travel of the panel carrier 31. The mask 47 has columns of apertures 51, which columns are substantially parallel to the stripes of the screen 49 and which apertures 51 are elongated in the long direction of the columns.

Mounted above the panel 41 on a pedastal (not shown) attached to the panel carrier 31 is a group of three closely-spaced sensors 55, 57 and 59 for measuring the intensities respectively of red, green, and blue visible light emitted from the screen 49. A red-transmission filter 55F is positioned in front of the red sensor 55. A green-transmission filter 57F is positioned in front of the green sensor 57, and a blue-transmission filter 59F is positioned in front of the blue sensor 59. A panchromatic, ultraviolet-blocking filter 61 is positioned between the sensors and the window 43. The ultraviolet-blocking filter 61 is mounted on a frame 62 which limits the light transmitted through the filter 61 to emissions from a desired localized area of the screen 49. The output of the sensors 55, 57 and 59 is connected to an electronic processing system or computer as shown by the block 71, which controls the printout and/or display on the mechanism represented by the box 79 or the calculated average widths of each of the different-color emitting stripes. A position-sensing transducer 63 is connected by a link 65 to the panel carrier 31. The electrical signal from the transducer 63 is fed to the computer 71 by the lead 67.

The panel 41 is placed on the carrier 31 as shown in FIG. 1, and the light source 37 is energized to emit ultraviolet light which illuminates the mask 47. The mask 47 shadows the screen 49, but the apertures 51 in the mask 47 permit ultraviolet light rays, defined by the solid lines 83 in FIG. 2, to pass through the mask 47 so that light spots 81 are incident upon the screen 49. Only two rays are shown passing through two apertures 51, but actually a ray passes through each of the apertures 51. The carrier 31 is now moved by the rod 33 to the left as shown in FIG. 1 a distance "S" (not shown). The window 43, the mask 49, the sensors 55, 57 and 59 and the various filters all move with the panel 41 on the panel carrier 31. When so moved, the angle of the light rays passing through the apertures 51 is altered so that the path of each light beam moves to a different position, as defined by the dotted lines 85. In so doing, the light spots 81 move across the widths of the stripes R, G and B a distance "d" to a position indicated by the numeral 87. The distance d equals S times p/q. During the move, the light spots excite the stripes to luminescence, emitting their characteristic visible light as shown by the arrows r, g and b in FIG. 2. The emissions of this visible light with respect to the position of the light spot during the scan are detected by the red, green and blue sensors 55, 57 and 59, and converted to trains of electrical signals. The ultraviolet pass filter 39 effectively blocks out all of the visible light coming from the region of the light source 37. The ultraviolet stop filter 61 effectively blocks out all of the ultraviolet light passing through the window 43 but passes substantially all of the visible light passing through the window 43. The red, green and blue filters 55F, 57F and 59F are associated with the respective red, green and blue sensors 55, 57 and 59 and pass visible spectral bands which identify only the emissions of a plurality of the red-emitting, green-emitting or blue-emitting stripes respectively.

Figure 3:
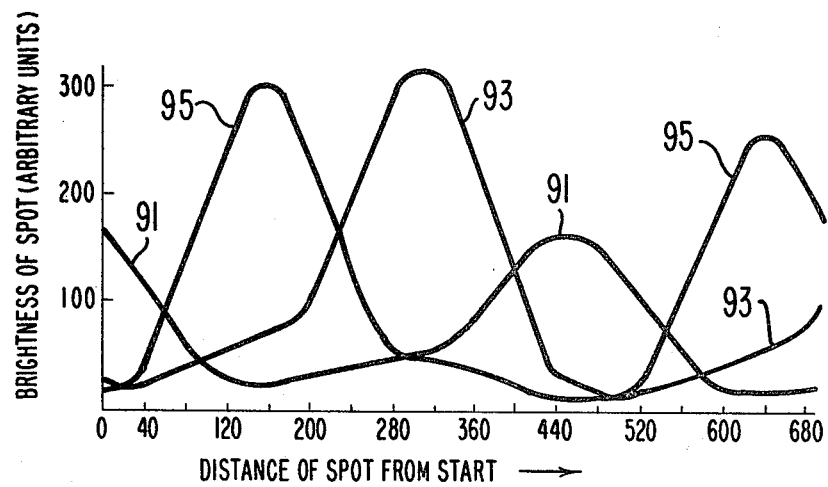
FIG. 3 is a family of curves showing output intensities in arbitrary units with respect to position of the ultraviolet spot for red-emitting, green-emitting and blue-emitting stripes of a particular screen obtained during the practice of the novel method.

A graph showing output stripe profiles from the three sensors is shown in FIG. 3 by the graph lines 91, 93 and 95 for the red, green and blue emissions respectively. The average width of each of the color stripes is a function of the distance over which the intensities shown by the particular curve are above some given threshold value. Typical threshold values are one half the difference between the average maximum and minimum values of the curves. Where the three profiles are obtained at the same time, the average spacing between the stripes may also be determined by calculation since the average relative positions of the stripes are also determined.

The spot should be narrower in the direction of scanning than the widths of the stripes that are being scanned. The narrower the spot with respect to the widths of the stripes being scanned, the longer will be the maximum and minimums and the shorter will be the transitions therebetween of the curves such as those shown in FIG. 3. The spot may be elongated in the long direction of the stripes in order to increase the intensity of the emission from the spot.

The scanning speed should be much slower than the rate of decay of luminescence from the stripes. The greater the difference, the more accurate will be the results of the method. Smaller differences will substantially alter the minimum and transitional portions of the curves shown in FIG. 3.

While the novel method has been described using a shadow mask in producing and scanning the ultraviolet spots, the novel method may be practiced with any way of producing and scanning the spot. For example, a scanning spot produced by a moving laser beam may be used. There are also other alternatives to the various steps described above which may be used and still fall within the scope of the novel method.

I claim:

1. A method for determining the average width of luminescent stripes in a localized area of a luminescent viewing screen of the type comprising a plurality of parallel photoluminescent stripes, said method including (a) scanning the widths of said stripes by a beam of ultraviolet light, whereby said stripes are excited to emit light along the path of said scan, (b) sensing and converting to a train of electrical signals the emissions of light in an identifying spectral band emitted by selected ones of said stripes in said localized region with respect to the position of said spot in said path, (c) and then calculating the average width of said selected ones of said stripes from the calculated distance over which the emissions of said signals are continuously above an assigned value.

2. The method according to claim 1 wherein the decay time of said emissions of light is substantially less than said time in which the intensity of said signals is continuously above said assigned value, and said light spot is substantially narrower in the direction of said scan than the width of said stripes.

3. The method defined in claim 1 wherein said identifying spectral band is defined by passing said emissions of light through an optical filter which selectively passes the principal emission from said selected ones of said stripes.

4. The method according to claim 1 wherein said screen is to be operated in a color-television picture tube in a prescribed spaced relation with a shadow mask having therin columns of apertures which are elongated in the long direction of said columns, said columns being substantially parallel to the length of said stripes, and said method includes (i) assembling said shadow mask into said spaced relation with said viewing screen;

(ii) illuminating said screen through said mask from an ultraviolet light source, whereby rays of ultraviolet light pass through said apertures producing light spots upon said screen; and (iii) causing the widths of stripes comrpising said screen to be scanned by said light spots, whereby said stripes are excited to photoluminescence along the paths of said scan.

5. The method according to claim 4 wherein, in step (ii), said screen is illuminated by a linear light source spaced a substantial distance from said mask with the length thereof substantially parallel to the length of said stripes, and wherein, in step (iii) said scanning is achieved by moving said light source with respect to said mask and screen in a transverse direction with respect to the length of said stripes.

6. The method defined in claim 4 wherein, in step (iii), said light source is stationary and scanning is achieved by moving said mask and said viewing screen together in a transverse direction with respect to the length of said stripes.

7. The method defined in claim 4 wherein said viewing screen is supported on a transparent support, said screen is scanned from one side thereof and said photoluminescence is collected at the other side of said screen.

8. The method according to claim 4 wherein said screen consists essentially of three different pluralities of parallel contiguous stripes of each of three different visual emission colors arranged in a regular cyclical order.

9. The method according to claim 6 wherein said viewing screen is of the type used in a color-television picture tube and said three emission colors are red, green and blue.

10. The method according to claim 6 including, at steps (b) and (c), simultaneously sensing the emissions from each of said three different pluralities of stripes, converting the sensed emissions to three different trains of electrical signals portions of the emissions in three different identifying spectral bands, and calculating the widths and spacings of stripes from each of said different pluralities of stripes.

* * * * *